United States Patent
Lin et al.

(10) Patent No.: US 9,058,083 B2
(45) Date of Patent: Jun. 16, 2015

(54) TOUCH SENSING STRUCTURE AND METHOD FOR MAKING THE SAME

(75) Inventors: Ching-Shan Lin, Tainan (TW); Yu-Jen Chen, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 862 days.

(21) Appl. No.: 13/044,568

(22) Filed: Mar. 10, 2011

(65) Prior Publication Data

US 2012/0007827 A1 Jan. 12, 2012

(30) Foreign Application Priority Data

Jul. 7, 2010 (CN) .......................... 2010 1 0224950

(51) Int. Cl.
G06F 3/044 (2006.01)

(52) U.S. Cl.
CPC ...... *G06F 3/044* (2013.01); *G06F 2203/04111* (2013.01)

(58) Field of Classification Search
CPC ........................ G06F 3/044; G06F 2203/04111
USPC ..................... 345/173–184; 178/18.01–20.04
See application file for complete search history.

(56) References Cited

U.S. PATENT DOCUMENTS

| | | | |
|---|---|---|---|
| 2007/0229466 A1 | 10/2007 | Peng | |
| 2009/0315859 A1* | 12/2009 | Chien et al. | 345/175 |
| 2010/0000803 A1* | 1/2010 | Yang | 178/18.06 |
| 2010/0007616 A1* | 1/2010 | Jang | 345/173 |
| 2010/0156840 A1* | 6/2010 | Frey et al. | 345/174 |
| 2010/0163394 A1* | 7/2010 | Tang et al. | 200/600 |
| 2010/0182256 A1* | 7/2010 | Jeong et al. | 345/173 |
| 2010/0214247 A1* | 8/2010 | Tang et al. | 345/173 |
| 2010/0271328 A1* | 10/2010 | Sekiguchi et al. | 345/174 |
| 2010/0302206 A1* | 12/2010 | Yu et al. | 345/174 |
| 2010/0309160 A1* | 12/2010 | Lin | 345/174 |
| 2010/0328248 A1* | 12/2010 | Mozdzyn | 345/174 |
| 2011/0096018 A1* | 4/2011 | Lee et al. | 345/174 |
| 2011/0210935 A1* | 9/2011 | Chuang | 345/174 |
| 2011/0310037 A1* | 12/2011 | Moran et al. | 345/173 |
| 2012/0073124 A1* | 3/2012 | Chien et al. | 29/622 |
| 2012/0127099 A1* | 5/2012 | Liu et al. | 345/173 |

* cited by examiner

*Primary Examiner* — Allison Johnson
*Assistant Examiner* — Vinh Lam
(74) *Attorney, Agent, or Firm* — Gokalp Bayramoglu (57) ABSTRACT

The present invention discloses a touch sensing structure for capacitive touch panel comprising a substrate, at least one first conductive line formed on the substrate, an insulating layer formed on the substrate and covering the first conductive line, the insulating layer having at least two adjacent holes therein formed above the two ends of the first conductive line respectively, at least two adjacent first conductive cells, at least two adjacent second conductive cells and at least one second conductive line formed on the insulating layer, the adjacent first conductive cells connected to two ends of the first conductive line correspondingly, the second conductive cells located on two sides of the first conductive line respectively, the second conductive line located on the insulating layer for interconnecting the adjacent second conductive cells, and the insulating layer makes the first conductive line electrically insulated from the second conductive line, thereby forming the touch sensing structure.

22 Claims, 6 Drawing Sheets

TOUCH SENSING STRUCTURE AND METHOD FOR MAKING THE SAME

BACKGROUND OF THE INVENTION

1. Technical Field

The present invention generally relates to touch sensing technology, and more particularly to a touch sensing structure for a capacitive touch panel and a method for making the structure.

2. Description of the Background

In recent years, the touch panel gets more and more popular, and has the tendency to replace the mouse and keyboard in the future. Touch panels have been widely used in many electronic devices to enable users to input data. Now, a touch panel is always integrated with a display panel, so the users can select an operation by directly touching the corresponding images shown on the display panel. Therefore, such a combined structure of the touch panel and the display panel provides users with better portability and more comfortable input operation.

There are many types of touch panels, such as resistance touch panel, capacitive touch panel, infrared sensing touch panel, electromagnetic sensing touch panel, and acoustic wave sensing touch panel, according to different technology principles. Herein, the capacitive touch panel is a comparatively better type because of its high sensitivity, low cost, and simple structure. Theoretically, the capacitive touch panel determines the touch position by detecting the capacitance changes of the electrodes caused by the touch of human body or other grounded material.

Figure 1:
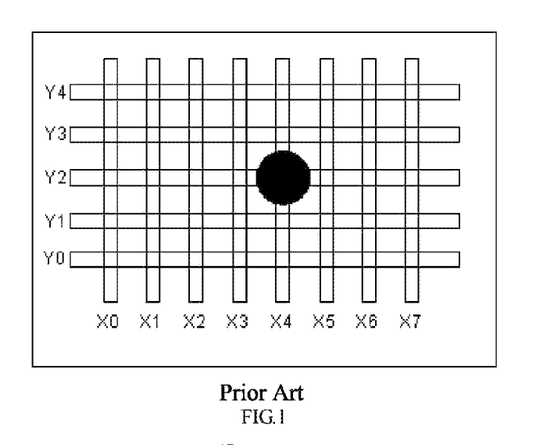
FIG. 1 is a schematic view showing a conventional capacitive touch panel.

Referring to FIG. 1, a conventional capacitive touch panel has x-axis (X0-X7) and Y-axis (Y0-Y4) electrode strips. In operation, a control circuit scans the electrode strips sequentially. When a human finger or other grounded conductors touch a point (shown as black area) of the capacitive touch panel, the capacitance of the X-axis electrode strips and Y-axis electrode strips being touched changes, and after sensing the capacitance of the electrode strips, the control circuit will determine the X-axis and Y-axis coordinates of the touched position based on the capacitance change.

Figure 2:
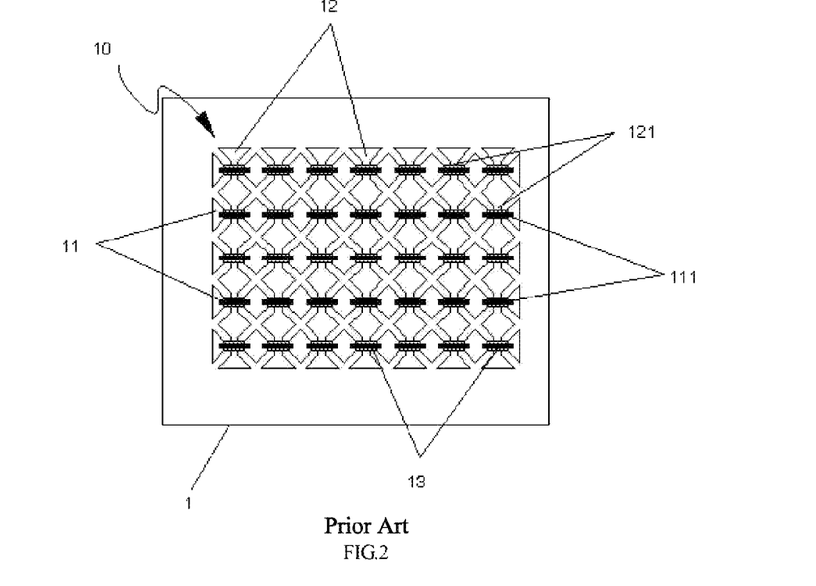
FIG. 2 is a schematic view of a touch sensing structure of the conventional capacitive touch panel shown in the FIG. 1.

Referring to FIG. 2, a touch sensing structure for capacitive touch panel is shown. The touch sensing structure 10 includes a plurality of first electrode units 11, a plurality of second electrode units 12, a plurality of first conductive lines 111, a plurality of second conductive lines 112, and a plurality of insulators 13 disposed between the first conductive lines 111 and the second conductive lines 112. The first electrode units 11 and the second electrode units 12 are formed on the substrate 1. Each first conductive line 111 is used for interconnecting adjacent first electrode units 11 and each second conductive line 112 is used for interconnecting adjacent second electrode units 12. Each insulator 13 is formed between a first conductive line 111 and a corresponding second conductive line 112 to make the first conductive line 111 electrically insulated from the second conductive line 112.

Figure 3:
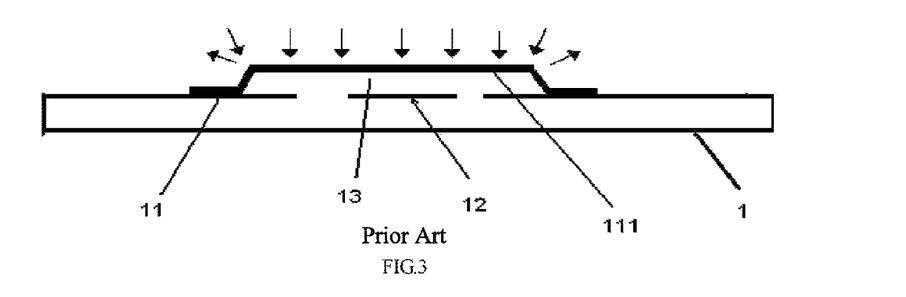
FIG. 3 is a side view of the touch sensing structure shown in FIG. 2, showing the light reflection and refraction of the touch sensing structure.

Referring to FIG. 3, a side view of the touch sensing structure 10 of FIG. 2 is shown. Because of the disposition of the insulators 13, there are many protrusions of the touch sensing structure. Therefore reflection and refraction of light are easily caused by the protrusions and the visibility of the first conductive line 111 is increased. Consequently, the light transmittance of the touch sensing structure can not be enhanced. Furthermore, because the first conductive lines 111 bestride the insulators, the first conductive lines 111 are easy to breakdown under external forces.

Therefore, a new touch sensing structure not only having a comparatively high light transmittance but also a comparatively high rigidity is needed to overcome said shortcomings.

SUMMARY OF THE INVENTION

The present invention is to provide a touch sensing structure for capacitive touch panel having an insulating layer so as to increase the light transmittance and the rigidity of the touch sensing structure.

Another object of the present invention is to provide a touch sensing structure having comparatively higher electronic conductivity.

A further object of the present invention is to provide a manufacturing method of making the touch sensing structure to increase the light transmittance and rigidity of the touch sensing structure, and to have comparatively more simple manufacturing processes.

A further object of the present invention is to provide a touch panel having the touch sensing structure of the present invention.

A further object of the present invention is to provide a touch screen having the touch panel of present invention.

In general, the present invention discloses a touch sensing structure comprising at least one first conductive line formed on the substrate, an insulating layer formed on the substrate covering the first conductive line, which has at least two adjacent holes therein formed above the two ends of the first conductive line respectively, at least two adjacent first conductive cells, at least two adjacent second conductive cells and at least one second conductive line formed on the insulating layer. The adjacent first conductive cells are connected to two ends of the first conductive line correspondingly, the second conductive cells are located on two sides of the first conductive line respectively, and the second conductive line are located on the insulation layer to interconnect the adjacent second conductive cells and to make the first conductive line electrically insulated from the second conductive line, thereby forming the touch sensing structure.

Accordingly, the first conductive line comprises at least one layer made of metal. For example, the first conductive line comprises an upper layer, a middle layer and a lower layer, the middle layer is disposed between the upper layer and the lower layer. The upper layer and the lower layer are made of molybdenum and the middle layer is made of aluminum.

In another aspect, the present invention also discloses a method of making a touch sensing structure, which includes: (a) forming the first conductive line on a substrate; (b) forming the insulating layer covering the first conductive line, wherein the insulating layer has at least two adjacent holes formed above the two ends of the first conductive line respectively; (c) forming the adjacent first conductive cells, adjacent second conductive cells and second conductive line on the insulating layer; the adjacent first conductive cells are connected to two ends of the first conductive line correspondingly, and the second conductive cells are located on two sides of the first conductive line respectively. The second conductive line is located on the insulation layer to interconnect the adjacent second conductive cells, and the insulating layer makes the first conductive line electrically insulated from the second conductive line, thereby forming the touch sensing structure.

Accordingly, each above mentioned step is performed by a photo lithography process comprising sputtering, exposing, developing and etching sequentially.

The present invention further discloses a capacitive touch panel, which includes: a touch sensing structure of present invention for sensing a touch action thereon and generating corresponding touch sensing signals, at least one first signal line formed on a first edge of the substrate and at least one second signal line formed on a second edge adjacent to the first edge of the substrate for conducting the touch sensing signals, and a controller for receiving and processing the touch sensing signals.

The present invention further discloses a touch screen comprising: a capacitive touch panel of present invention for sensing a touch action thereon and generating corresponding touch sensing signals, a processor for receiving and processing the touch sensing signals and generating corresponding display instruction signals, and a display for receiving the display instruction signals and displaying corresponding images.

The above mentioned summary is not intended to describe each embodiment or every implementation of the present disclosure. Advantages and attainments, together with a more complete understanding of the invention, will become apparent and appreciated by referring to the following detailed description and claims taken in conjunction with the accompanying drawing.

BRIEF DESCRIPTION OF THE DRAWING

These and other features and advantages of the various embodiments disclosed herein will be better understood with respect to the following description and drawings, in which like numbers refer to like parts throughout, and in which.

DETAILED DESCRIPTION

Now referring to the figures more specifically, in which identical or similar parts are designated by the same reference numerals throughout.

Figure 4A:
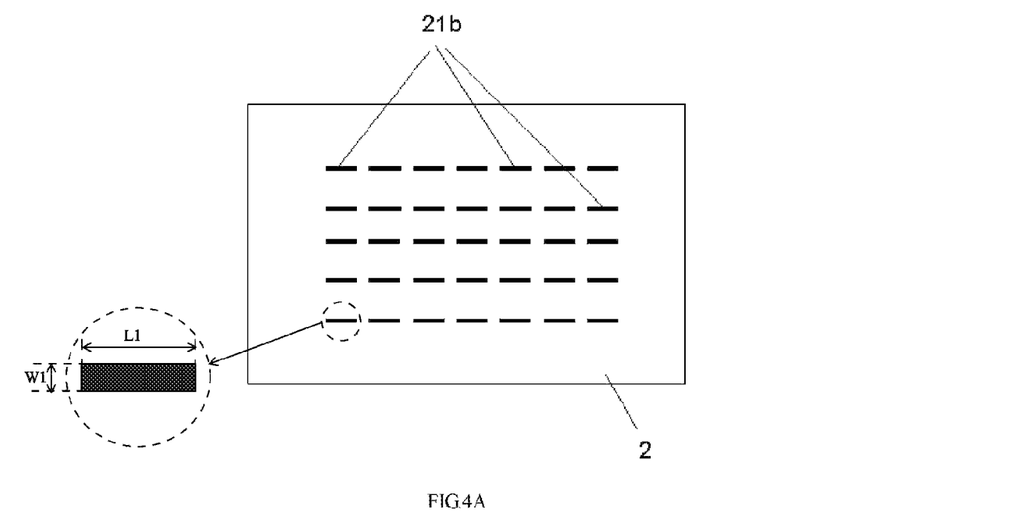
FIGS. 4A-4D are schematic views of pattern structures in different manufacturing statuses during a manufacturing method making the touch sensing structure according to the present invention.

In this section, a manufacturing method of making the touch sensing structure of the present invention will be depicted. FIGS. 4A-4D are schematic views of pattern structures in different manufacturing statuses during the manufacturing method making the touch sensing structure. The detailed flow chart of the manufacturing method is shown in FIG. 5. The manufacturing method includes following steps.

In step 501, a plurality of first conductive lines 21b are formed on a surface of substrate 2. In detail, the step 501 further comprises: providing a substrate 2, the substrate 2 can be cleaned if it is not clean; sputtering a conductive layer on the cleaned Substrate 2; covering a mask over the sputtered substrate 2, then exposing the sputtered substrate 2 under a light to develop a pattern on the sputtered substrate 2; etching the patterned substrate 2 to form the first conductive lines 21b on the substrate 2. After the step 501 is finished, a first temporary pattern is generated and is shown in FIG. 4A. Normally, the first conductive line 21b has the shape of rectangle, the length "L1" of first conductive line 21b is about 100 µm-300 µm, the width of the first conductive line 21b is about 5 µm-100 µm, and the thickness of first conductive line 21b is about 50 Å-1500 Å.

Figure 4B:
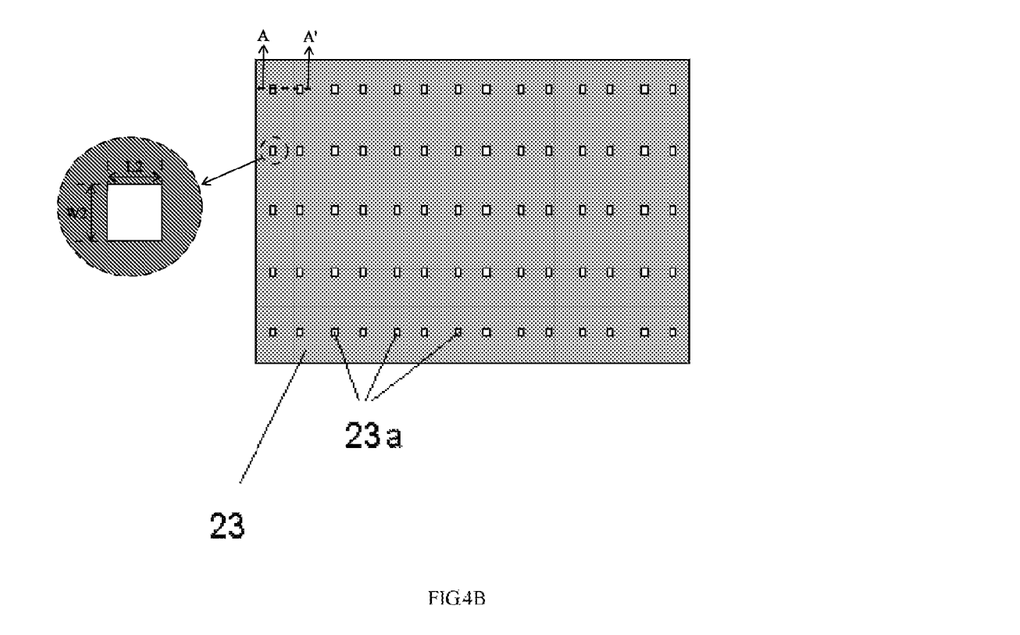
Figure 4C:
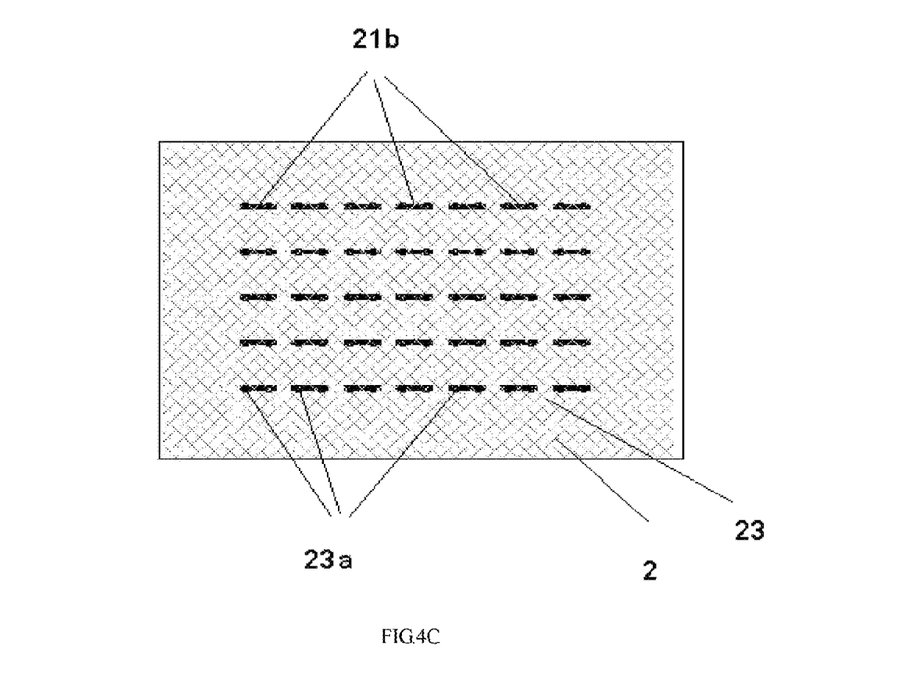
Figure 4D:
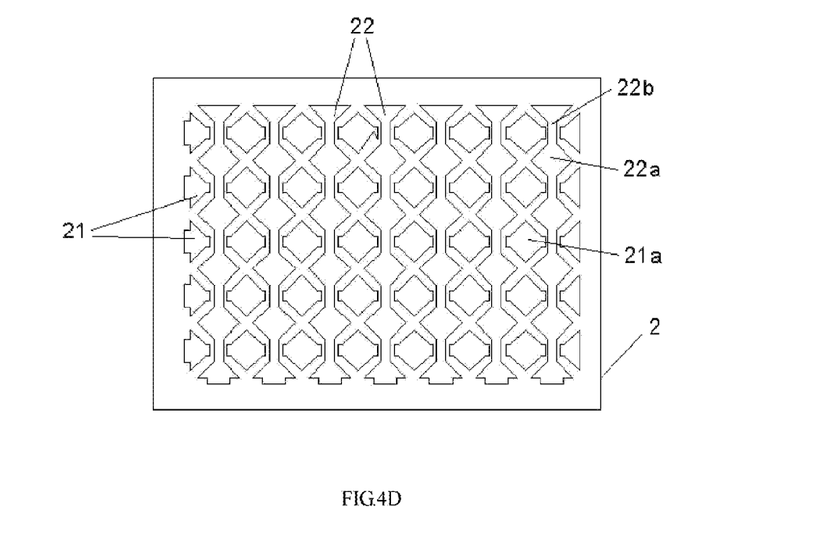
Figure 5:
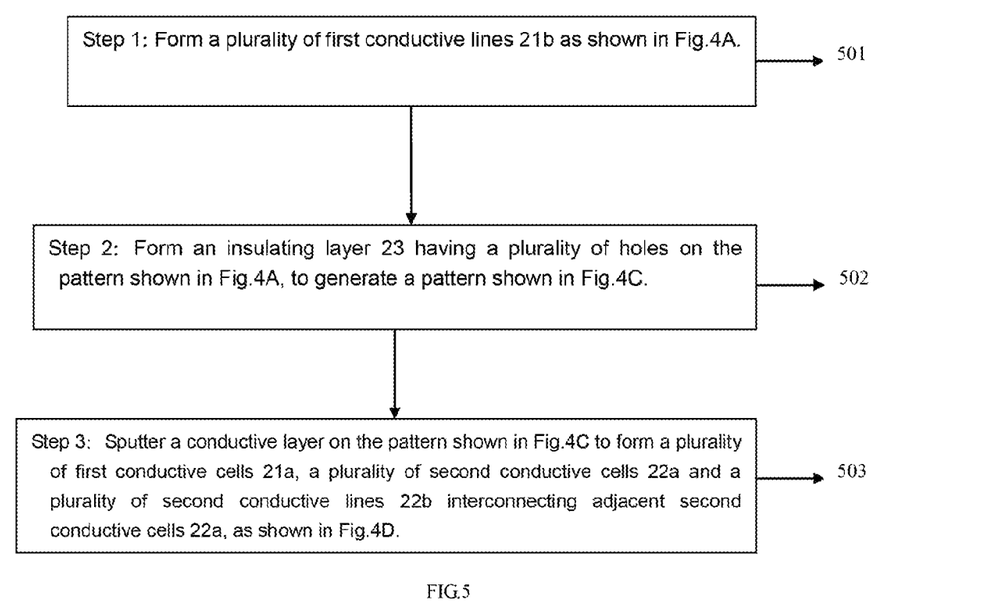
FIG. 5 is a flow chart showing the manufacturing method.

In step 502, an insulating layer 23 is formed on the first temporary pattern shown in FIG. 4B. The insulating layer 23 completely covers the surface of the substrate 2 where the first conductive lines 21b are formed. The insulating layer 23 covers all the first conductive lines 21b and has a plurality of holes 23a therein formed above the two ends of the first conductive lines 21b respectively. In detail, the step 502 comprises: sputtering an insulating layer on the first temporary pattern shown in FIG. 4A; covering a mask over the substrate 2, then exposing the sputtered first temporary pattern to light to develop a second pattern, on the sputtered first temporary pattern; etching the patterned substrate 2 to form an insulating layer 23 having a plurality of holes 23a. After the step 502 is finished, a second temporary pattern is generated and is shown in FIG. 4C. In actual manufacturing process, the transmittance rate of the insulating layer is greater than 85%; the holes 23a have the shape of frustum. Normally, the underside of the frustum has a length of 20 µm-50 µm, and the insulating layer has a thickness of 1 µm-3 µm.

In step 501, a plurality of first conductive lines 21b are formed on a surface of substrate 2. In detail, the step 501 further comprises: providing a substrate 2, the substrate 2 can be cleaned if it is not clean; sputtering a conductive layer on the cleaned substrate 2; covering a mask over the sputtered substrate 2, then exposing the sputtered substrate 2 under a light to develop a pattern on the sputtered substrate 2; etching the patterned substrate 2 to form the first conductive lines 21b on the substrate 2. After the step 501 is finished, a first temporary pattern is generated and is shown in FIG. 4A. Normally, the first conductive line 21b has the shape of rectangle, the length "L1" of first conductive line 21b is about 100 µm-300 µm, the width "W1" of the first conductive line 21b is about 5 µm-100 µm (as shown in the enlarged portion of FIG. 4A), and the Thickness h1 of first conductive line 21b is about 50 Å-1500 Å (please refer to FIG. 11).

Figures 10, 11:
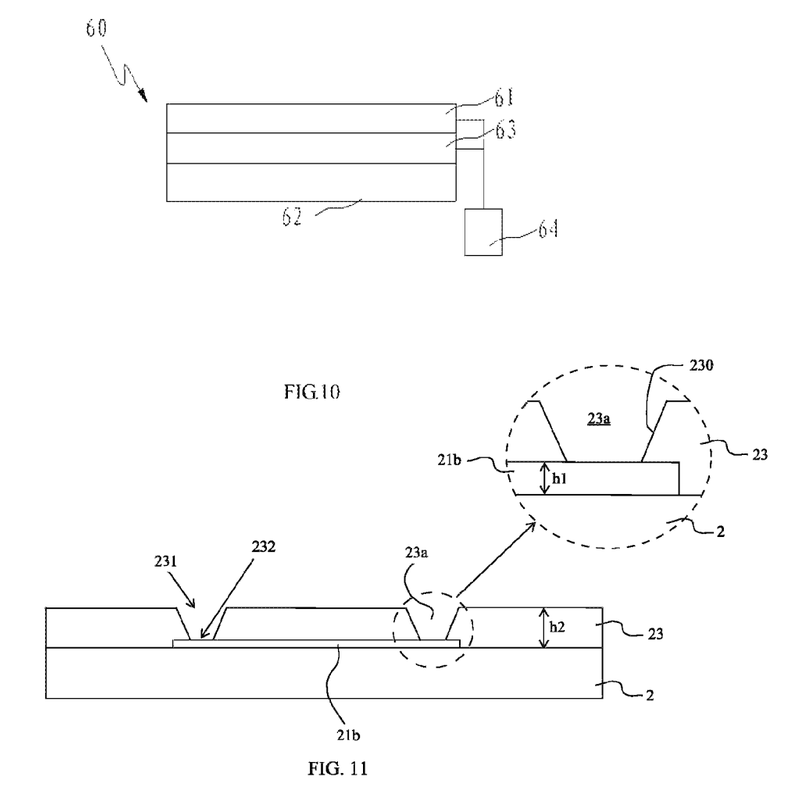
FIG. 10 is a schematic view of a touch screen having the capacitive touch panel in accordance with the present invention.
FIG. 11 is a cross-sectional view of AA' section of FIG. 4B.

In step 502, an insulating layer 23 is formed on the first temporary pattern shown in FIG. 4B. The insulating layer 23 completely covers the surface of the substrate 2 where the first conductive lines 21b are formed. The insulating layer 23 covers all the first conductive lines 21b and has a plurality of holes 23a therein formed above the two ends of the first conductive lines 21b respectively. In detail, the step 502 comprises; sputtering an insulating layer on the first temporary pattern shown in FIG. 4A; covering a mask over the substrate 2, then exposing the sputtered first temporary pattern to light to develop a second pattern, on the sputtered first temporary pattern; etching the pattern substrate 2 to form an insulating layer 23 having a plurality of holes 23a. After the step 502 is finished, a second temporary pattern is generated and is shown in FIG. 4C. In actual manufacturing process, the transmittance rate of the insulating layer is greater than 85%; the holes 23a have the shape of frustum. Normally, as shown in the enlarge portion of FIG. 4B, the underside of the frustum (i,e., the bottom opening portion 232) has a length "L2" of 20 μm-50 μm, a width "W2" 20 μm-50 μm. Furthermore, FIG. 11 is a cross-sectional view of AA' section of FIG. 4B. As shown in FIG. 11, the insulating layer 23 has a thickness h2 of 1 μm-3 μm. In addition, the holes 23 a of the shape of frustum is defined by at least one inclined sidewall 230. In detail, each hole 23a has a top opening portion 231 and a bottom opening portion 232, and the top opening portion 231 has a larger area than the bottom opening portion 232.

In the manufacturing method, the substrate 2 is made of transparent insulating material, such as glass or plastic film. The first conductive cells 21a, the second conductive cells 22a and the second conductive lines 22b are made of transparent conductive material, such as Indium Tim Oxide (ITO), Antimony Tin Oxide (ATO) and Titanium Oxide ($TiO_2$). The insulating layer 23 is made of transparent insulating material such as epoxy resin, polyimide, polyvinyl chloride and methyl methacrylate. The first conductive lines 21b are made of transparent conductive material, such as Indium Tim Oxide (ITO), Antimony Tin Oxide (ATO) and Titanium Oxide ($TiO_2$), or made of metal, such as silver, copper, aluminum, gold and iron.

Figure 6:
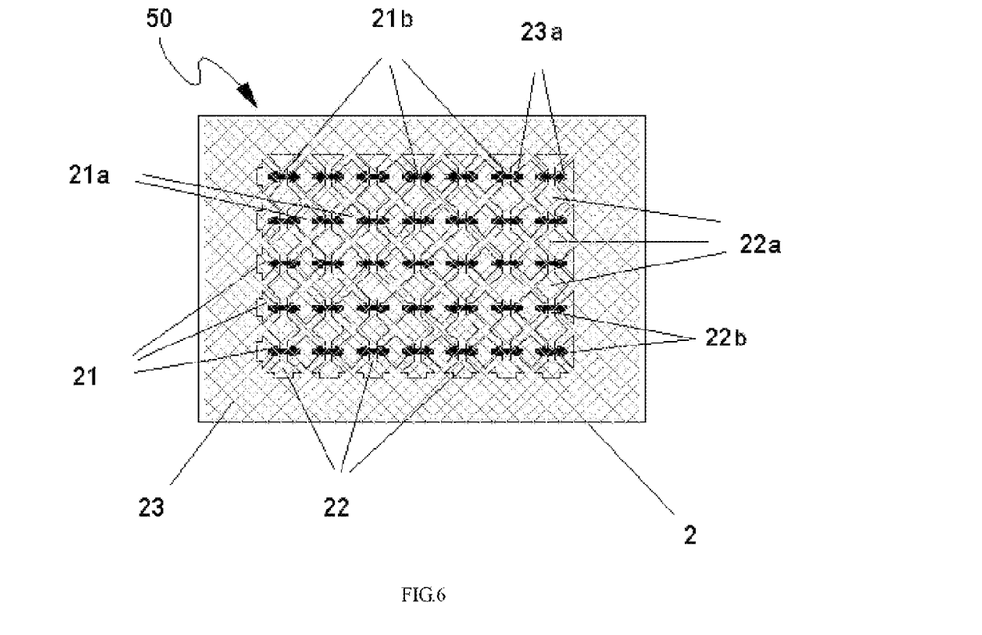
FIG. 6 is a schematic view of the touch sensing structure of the present invention.

After above steps are finished, a touch sensing structure 50 of the present invention is generated and is shown in FIG. 6. The touch sensing structure 50 includes a substrate 2, a plurality of first conductive assemblies 21 parallelly arranged in a first direction (such as the horizontal direction) and a plurality of second conductive assemblies 22 parallelly arranged in a second direction (such as the longitudinal direction) which are formed on the substrate 2. The first conductive assemblies 21 and the second conductive assemblies 22 are arranged perpendicularly to each other, forming a matrix structure.

In the manufacturing method, the substrate 2 is made of transparent insulating material, such as glass or plastic film. The first conductive cells 22a, the second conductive cells 22a and the second conductive lines 22b are made of transparent conductive material, such as Indium Tim Oxide (ITO), Antimony Tin Oxide (ATO) and Titanium Oxide ($TiO_2$). The first conductive cells 21a, the second conductive cells 22a and the second conductive line 22b have a thickness of 50 Å-1500 Å. The insulating layer 23 is made of transparent insulating material such as epoxy resin, polyimide, polyvinyl chloride and methyl methacrylate. The first conductive lines 21b are made of transparent conductive material, such as Indium Tim Oxide (ITO), Antimony Tin Oxide (ATO) and Titanium Oxide ($TiO_2$), or made of metal, such as silver, copper, aluminum, gold and iron.

The conductive lines 21b are formed on a surface of the substrate 2; the insulating layer 23 is formed on the substrate 2 and completely covers the first conductive line 21b; the holes 23a of the insulating layer 23 are formed above the two ends of the first conductive line 21b respectively; the first conductive cells 21a, the second conductive cells 22a and the second conductive line 22b are formed on the insulating layer 23; the adjacent first conductive cells 21a are connected to two ends of the first conductive line 21b correspondingly, thereby forming the touch sensing structure 50.

In the above mentioned structure, the first conductive assemblies 21 and the second conductive assemblies 22 can be arranged in an equal-spaced manner. It is noticed that they can also be arranged in a non-equidistance manner. The first conductive assemblies 21 and the second conductive assemblies 22 are arranged perpendicularly to each other, and they can also be arranged in a non-orthogonal manner. The first conductive cells 21a and the second conductive cells 22a are shaped as diamond. It is noticed that other polygon, such as hexagon, octagon, rectangle, square and triangle can also be used. The first conductive lines 21b are made of transparent conductive material, such as Indium Tim Oxide (ITO), Antimony Tin Oxide (ATO) and Titanium Oxide ($TiO_2$), or made of metal, such as silver, copper, aluminum, gold and iron.

Figure 7:
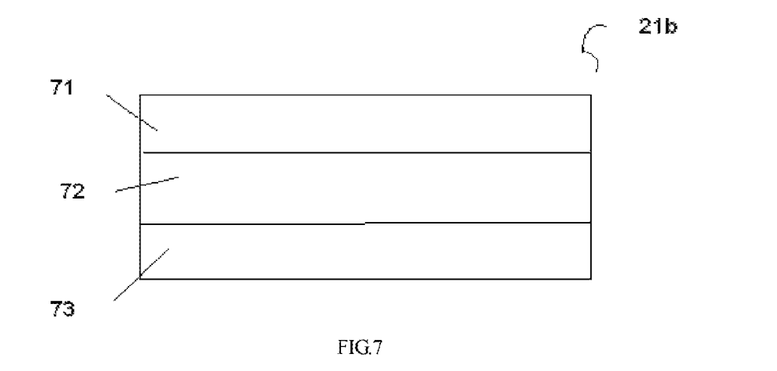
FIG. 7 is a schematic view of a first conductive line of the touch sensing structure shown in FIG. 6.

When the first conductive line 21b is made of metal, it can be constructed by one single layer or more layers. Referring to FIG. 7, a first conductive line 21b has a three-layer structure. The first conductive line 21b includes a first layer 71 (an upper layer), a second layer 72 (a middle layer) and a third layer 73 (a lower layer). The second layer 72 is disposed between the first layer 71 and the third layer 73. The first layer 71 and the third layer 73 are made of metal with high metallic stability, such as molybdenum. The second layer 72 is made of metal with high electronic conductivity, such as aluminum. The combination of the layers 71, 72 and 73 can provide not only the better electronic conductivity but also the metallic stability. Besides, molybdenum can improve the rigidity of the first conductive line 21b. In other embodiments, the first conductive lines 21b can have four layers, five layers, etc. In each situation, the middle layer is made of metal with high conductivity and the side layer is made of metal with high metallic stability.

Figure 8:
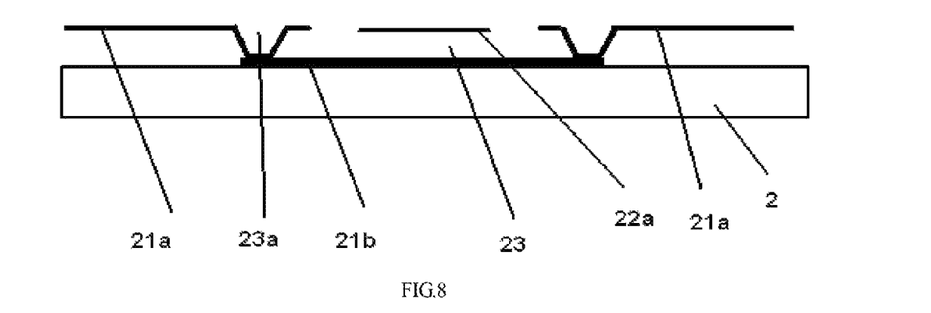
FIG. 8 is a side view of the touch sensing structure shown in FIG. 6, showing the light reflection and refraction of the touch sensing structure of the present invention.

Referring to FIG. 8, a side view of the touch sensing structure of the present invention is shown. The touch sensing structure uses an insulating layer 23 having a plurality of holes 23a completely covering the substrate 2. Compared with the conventional structure, the size of the holes 23a of the insulating layer 23 is far smaller than that of the insulators 13, so the light reflection and refraction of the touch sensing structure of the present invention is far less than that of the structure shown in FIG. 3, therefore reducing the visibility of the first conductive lines 21b and increasing the transmittance of the touch sensing structure.

Figure 9:
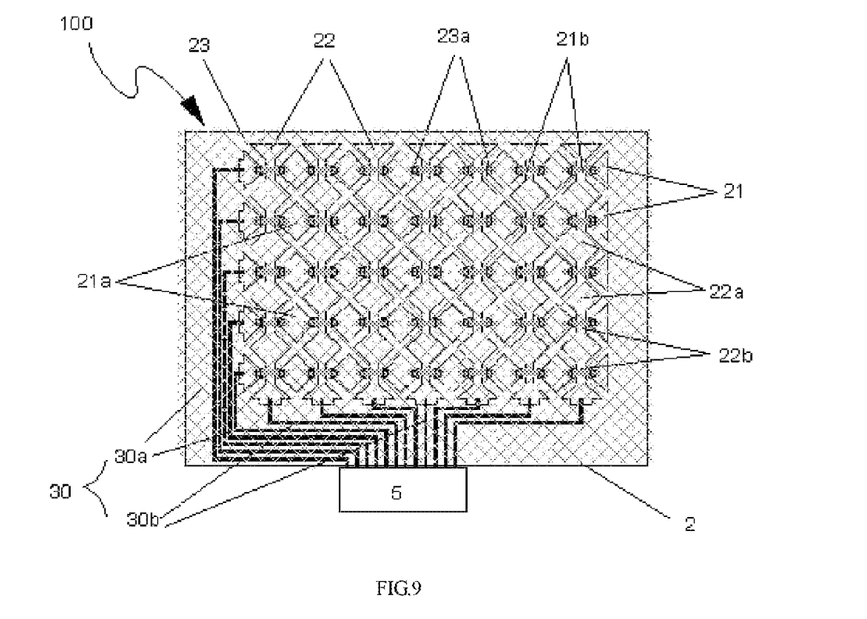
FIG. 9 is a schematic view of a capacitive touch panel having the touch sensing structure of the present invention.

FIG. 9 shows a capacitive touch panel 100. The capacitive touch panel 100 comprises a touch sensing structure of the present invention for sensing a touch action thereon and generating corresponding touch sensing signals, a signal lines group 30 formed on the edge of the substrate 2 for conducting the touch sensing signals, and a controller 5 for receiving and processing the touch sensing signals. The signal lines group 30 comprises a plurality of first signal lines 30a respectively formed on a first edge of the substrate 2 and a plurality of second signal lines 30b formed on a second edge of the substrate 2, and the second edge is adjacent to the first edge. Each first conductive assembly 21 is connected to the controller 5 through a corresponding first signal line 30a and each second conductive assembly 22 is connected to the controller 5 through a corresponding second signal line 30b.

The first signal lines 30a and second signal lines 30b can be made of transparent conductive material such as Indium Tim Oxide (ITO), Antimony Tin Oxide (ATO) or Titanium Oxide (TiO) or metal, such as silver, copper, aluminum gold and iron. The first signal lines 30a and the second signal lines 30b can be formed with the first conductive lines 21b simultaneously, so as to shorten the manufacturing process of the capacitive touch panel 100. Besides the first signal lines 30a and the second signal lines 30b are completely covered by the insulating layer 23 therefore the insulating layer 23 can also effectively protect the first signal lines 30a and the second signal lines 30b. Furthermore, the first signal lines 30a and the second signal lines 30b can have the same layer structure of first conductive lines 21b, such as three layers shown in FIG.

7, so as to increase the electronic conductivity, therefore increasing the sensitivity of the capacitive touch panel 100.

The capacitive touch panel of the present invention can be combined with a display, such as a liquid crystal display screen, to construct a touch screen. A touch screen 60 having the capacitive touch panel of the present invention is shown in FIG. 10. The touch screen 60 comprises a capacitive touch panel 61 for sensing the touch action thereon and generating corresponding touch sensing signals, a processor 64 for receiving and processing said touch sensing signals and generating corresponding display instruction signals; and a display 62 for receiving said display instruction signals and displaying corresponding images. An adhesive layer 63 disposed between the capacitive touch panel 61 and the display 62 is used to combine the capacitive touch panel 61 with the display 62.

The touch sensing structure of the present invention using a completely covered insulating layer can effectively reduce the light reflection and refraction so as to reduce the visibility of the first conductive line therefore increasing the transmittance of the touch sensing structure. Besides, the insulating layer can protect not only the first conductive lines but also the first signal lines and second signal lines therefore increasing the rigidity of the capacitive touch panel. Furthermore, the multi-layer structure of the first conductive line and the signal line group can also enhance the electronic conductivity of the capacitive touch panel, therefore increasing the sensitivity effectively.

The above description is only the preferred embodiment of the present invention, and therefore it should not limit the scope of the invention. It is to be noted that the equivalent changes or modifications made according to the claims and the specification of the present invention should be included in the scope of the invention.

What is claimed is:

1. A touch sensing structure, comprising:
   at least one first conductive line formed on a substrate;
   an insulating layer formed on the substrate and covering the first conductive line, and the insulating layer comprises at least two adjacent holes therein formed corresponding to the two ends of the first conductive line respectively, wherein each of the adjacent holes has at least one inclined sidewall;
   at least two adjacent first conductive cells formed on the insulating layer and connected to two ends of the first conductive line correspondingly, wherein each of the first conductive cells extends from a top surface of the insulating layer to the inclined sidewall to connect to the corresponding end of the first conductive line;
   at least two adjacent second conductive cells formed on the insulating layer and located on two sides of the first conductive line respectively; and
   at least one second conductive line formed on the insulating layer to be electronically insulated from the first conductive line, and the second conductive line interconnecting the adjacent second conductive cells.

2. The touch sensing structure of claim 1, wherein the first conductive cells, the second conductive cells and the second conductive line are made of transparent conductive material.

3. The touch sensing structure of claim 1, wherein the first conductive line is made of transparent conductive material or metal.

4. The touch sensing structure of claim 1, wherein the first conductive line comprises at least one layer made of metal.

5. The touch sensing structure of claim 1, wherein the first conductive line comprises a first layer, a second layer and a third layer, and the second layer is disposed between the first layer and the third layer.

6. The touch sensing structure of claim 5, wherein the second layer is made of metal with high electronic conductivity.

7. The touch sensing structure of claim 5, wherein the first layer and the third layer are made of a metal with high metallic stability.

8. The touch sensing structure of claim 7, wherein the second layer is made of aluminum.

9. The touch sensing structure of claim 1, wherein the insulating layer is made of transparent insulating material.

10. The touch sensing structure of claim 1, wherein the first conductive cells and the second conductive cells are of the shape of polygon.

11. The touch sensing structure of claim 1, wherein the first conductive line has the shape of rectangle, and wherein the first conductive line has a thickness of 50 Å-1500 Å.

12. The touch sensing structure of claim 11, wherein the length of the rectangle is 100 μm-300 μm, and the width of the rectangle is 5 μm-100 μm.

13. The touch sensing structure of claim 1, wherein each of the holes has a top opening portion and a bottom opening portion, and the top opening portion has an area larger than the bottom opening portion.

14. The touch sensing structure of claim 13, wherein the length of the bottom opening portion is 20 μm-50 μm, and wherein the width of the bottom opening portion is 20 μm-50 μm.

15. The touch sensing structure of claim 13, wherein each of the holes is partially filled with the first conductive cell such that a void is formed between the top opening portion of the hole and the first conductive cell in the hole.

16. The touch sensing structure of claim 15, wherein a portion of the first conductive cell overlies both the inclined sidewall and the bottom opening portion of the hole.

17. The touch sensing structure of claim 1, wherein the insulating layer has the thickness of 1 μm-3 μm.

18. A method of making the touch sensing structure of claim 1, comprising:
   (a) forming the first conductive line on a substrate;
   (b) forming the insulating layer covering the first conductive line with at least two adjacent holes therein formed corresponding to the two ends of the first conductive line respectively, wherein each of the adjacent holes has at least one inclined sidewall;
   (c) forming the adjacent first conductive cells, adjacent second conductive cells and second conductive line on the insulating layer, wherein each of the first conductive cells extends from a top surface of the insulating layer to the inclined sidewall to connect to the corresponding end of the first conductive line.

19. The method of claim 18, wherein each step is performed by a working procedure comprising sputtering, exposing, developing and etching sequentially.

20. A capacitive touch panel, comprising:
   a touch sensing structure of claim 1 for sensing a touch action thereon and generating corresponding touch sensing signals;
   at least one first signal line formed on a first edge of the substrate and at least one second signal line formed on a second edge adjacent to the first edge of the substrate for conducting the touch sensing signals; and
   a controller for receiving and processing the touch sensing signals.

21. The capacitive touch panel of claim 20, wherein the first signal line and the second signal line are covered by the insulating layer.

22. A touch screen, comprising:
- a capacitive touch panel of claim 20 for sensing a touch action thereon and generating corresponding touch sensing signals;
- a processor for receiving and processing said touch sensing signals and generating corresponding display instruction signals; and
- a display for receiving said display instruction signals and displaying corresponding images.

\* \* \* \* \*